United States Patent [19]

Freund

[11] 3,940,206

[45] Feb. 24, 1976

[54] BIASING PADS FOR EYEGLASS FRAMES

[76] Inventor: Erich Freund, 4845 California St., San Francisco, Calif. 94118

[22] Filed: Dec. 30, 1974

[21] Appl. No.: 537,095

[52] U.S. Cl. .............................................. 351/111
[51] Int. Cl.² .......................................... G02C 5/14
[58] Field of Search ............. 351/111, 123, 158, 41, 351/66

[56] References Cited
UNITED STATES PATENTS 3,874,775   4/1975   Lazarus........................... 351/111 X

*Primary Examiner*—Paul A. Sacher
*Attorney, Agent, or Firm*—Eckhoff, Hoppe, Slick, Mitchell & Anderson

[57] ABSTRACT

Improved biasing pads for eyeglass frames are provided for positioning between the lens portion of the frames and the temple bars in abutting engagement therewith so as to bias the temple bars inwardly against the head of the wearer. The biasing pads are made up of one or more plys or layers of a yieldable, nonresilient material and are adhesively applied to the eyeglass frames in layers so that the thickness and biasing effect of the pads may be varied as desired.

1 Claim, 4 Drawing Figures

U.S. Patent  Feb. 24, 1976  3,940,206
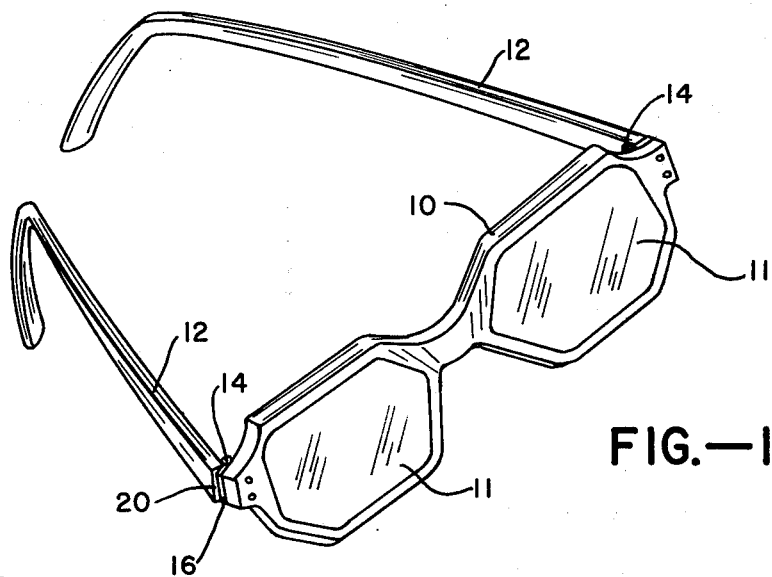
FIG.—1
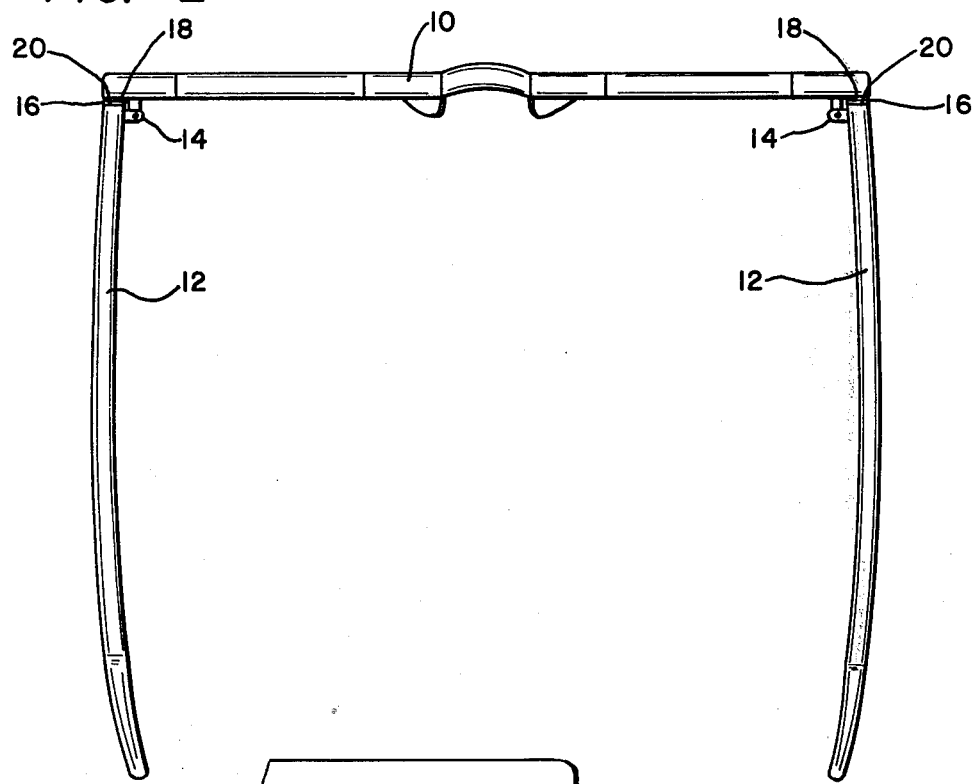
FIG.—2
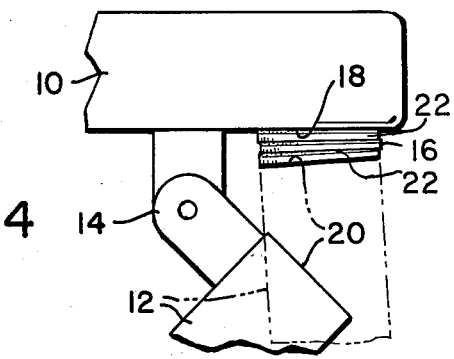
FIG.—4
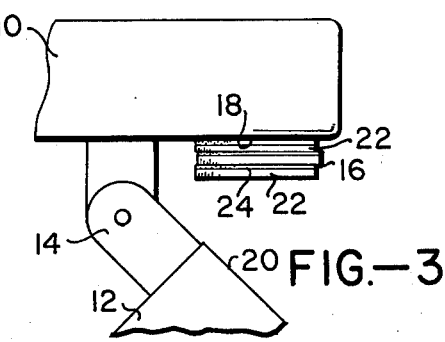
FIG.—3

BIASING PADS FOR EYEGLASS FRAMES

The invention relates to biasing pads for eyeglass frames and, more particularly, to an imroved biasing pad construction to insure a proper fit of eyeglasses and eliminate sliding movement of the eyeglasses relative to the wearer's head.

As any wearer of eyeglasses knows, the most irritating aspect of wearing glasses is the tendency for the frames to slide during movement by the wearer. The problem is particularly acute whenever the wearer bends over, looks down, or otherwise moves his or her head in such a way that the frames for the lenses are lower than the temple bars. Although the frames and temple bars are customarily fitted at the time of purchase so as to fit snugly on the head of the wearer, they soon lose their snug fit and the glasses become loose and slide down the wearer's nose during movement of the wearer's head. The problem has been recognized and various solutions proposed. See, for example, U.S. Pat. No. 3,428,392 which issued Feb. 18, 1969 to J. L. Chaney, U.S. Pat. No. 2,684,014 which issued July 20, 1954 to H. S. Fairly, U.S. Pat. No. 2,761,353 which issued Sept. 4, 1956 to M. J. Eustis and U.S. Pat. No. 3,156,757 which issued Nov. 10, 1964 to J. Spina.

Although numerous attempts have been made to solve the problem of maintaining the proper fit of eyeglass frames, these prior art attempts have not been successful. One prior art approach has been to insert a hard, unyielding surface, in the form of a metal clip, between the lens frame and the temple bars. See, for example, U.S. Pat. No. 3,387,910 which issued June 11, 1968 to O. T. Giraldi. Such an arrangement permits of no adjustment and, therefore, requires a preciseness not easily attained in simple devices of this nature. A more common prior art approach exemplified by the previously mentioned patents has employed resilient biasing pads between the temple bars and the lens frame. In this approach an elastomeric material, such as rubber, is used. Experience has shown that the use of such resilient biasing pads have not been effective in achieving a lasting, satisfactory result.

It is the object of the present invention to provide an improved biasing pad construction which will solve the problem by providing means by which the wearer may insure a continuing snug fit so as to eliminate movement of the glasses relative to the wearer's head.

The applicant's invention comprises improved biasing pads for eyeglass frames. The biasing pads are mounted between the front frame portion for the eyeglass lenses and the temple bars, so as to be in abutting engagement with both the front lens frame portion and the ends of the temple bars. Unlike prior art devices, the biasing pads are made up of one or more plys or layers of a yieldable, nonresilient material adhesively applied either to the lens frame or the temple bars. By reason of the nature of the pads and their availability in multiple layers or plys, an optician or the wearer of the eyeglasses may, by trial and error, vary the thickness and biasing effect of the pads until a lasting and comfortably snug fit of the temple bars is achieved.

In the drawings:

FIG. 1 is a perspective view of a pair of eyeglasses fitted with the present invention;

FIG. 2 is a top plan view showing the positioning of the biasing pads;

FIG. 3 is an enlarged detail view showing a plurality of biasing pad plys applied to a pair of eyeglasses and prior to compression by the temple bars; and FIG. 4 is a view similar to FIG. 3 showing the biasing pads after compression.

A preferred form of applicant's improved biasing pads for eyeglass frames is shown in the accompanying drawings. As is customary, the eyeglass frames comprise a front portion 10 that surrounds and supports the eyeglass lenses 11. A pair of temple bars 12 are pivotally secured to the front frame portion 10 by hinges 14 for pivotal abutting engagement therewith when the glasses are being worn. Biasing pads 16 are mounted between the front frame portion 10 and the temple bars 12 in order to limit the outward pivotal movement of the temple bars away from the wearer's head. Since outward pivotal movement of the temple bars is limited by the biasing pads 16, the temple bars 12 are forced to snugly engage the wearer's head. As shown, the biasing pads 16 are adhesively mounted to the end surfaces 18 of the front frame portion 10 which normally abut against the inner edge portions 20 of the temple bars 12. Alternatively, the biasing pads may be mounted on the inner edge portions of the temple bars 12 if desired.

The biasing pads 16 are made in a plurality of plys or layers 22. Each of the individual layers or plys 22 may be adhered to the next adjacent layer by means of a suitable layer of adhesive 24. The biasing pads 16 are made from a yieldable, nonresilient material which may be compressively deformed without significant recovery. It has been found that biasing pads made from such material are especially suitable for biasing the temple bars of the eyeglasses, particularly when available in a plurality of thin layers or plys. In use, such biasing pads are automatically compressed to the proper degree by the inner edge portions 20 of the temple bars 12 so as to achieve a snug fit of the temple bars against the wearer's head. By reason of the multi-ply construction, the effective thickness of the biasing pads 16 can be built up by an optician, or the wearer, until the desired biasing effect is achieved. This is particularly advantageous since the necessary biasing effect required in the case of each individual wearer of eyeglasses will vary over a relatively wide range. It is this condition which limits the usefulness of biasing pads manufactured to a predetermined thickness, for such pads can satisfactorily perform in only a limited number of cases. Moreover, applicant's pads in use become sufficiently compressed to form a hard unyielding surface which then maintains the proper degree of biasing effect for a long time.

It will be recognized that the pads 16 may be applied to the glasses at the time they are purchased or at a later date. In either event, the pads 16 can be cut or otherwise shaped to conform to the particular contour of the front frame portion 10 or inner edge portions of the temple bars 12 and may be colored to match the color of the eyeglass frame so as to maintain the normal appearance of the glasses.

I claim:

1. Biasing pads for eyeglass frames having a lens frame and a pair of temple bars pivotaly abutting the frame, said pads mounted between the lens frame and the abutting end of the temple bars so as to bias the temple bars inwardly against the head of the wearer, said biasing pads being made from a yieldable, nonresilient material, and each of said pads having an adhesive layer thereon whereby said pads may be joined in a plurality of plys so the effective thickness of the pads may be selectively varied as desired.

* * * * *